United States Patent [19]

Lacour

[11] Patent Number: 5,058,819
[45] Date of Patent: Oct. 22, 1991

[54] PAYING OUT/WINDING IN DEVICE FOR ELIMINATING TORSION IN A LINE IN A ROTARY CONNECTION

[75] Inventor: Gilles Lacour, Lechaud, France

[73] Assignee: L'Enrouleur Electrique Moderne, Belley, France

[21] Appl. No.: 482,700

[22] Filed: Feb. 21, 1990

[30] Foreign Application Priority Data

Feb. 24, 1989 [FR] France .............................. 89 02397

[51] Int. Cl.$^5$ ............................................ B65H 75/38
[52] U.S. Cl. .................................. 242/54 R; 191/12.4
[58] Field of Search ............... 242/54 R, 47.01, 47.12, 242/85.1, 86.1, 100.1, 82, 128; 191/12 R, 12.2 R, 12.2 A, 12.4

[56] References Cited

U.S. PATENT DOCUMENTS

| 2,605,977 | 8/1952 | Gleason | 242/54 R |
|---|---|---|---|
| 2,874,918 | 2/1959 | Steiber | 242/82 |
| 3,099,412 | 7/1963 | Nystrom et al. | 242/47.01 |
| 3,120,355 | 2/1964 | Bowman | 242/47.12 |
| 4,036,448 | 7/1977 | Carey et al. | 242/82 X |
| 4,065,066 | 12/1977 | Swett et al. | 242/47.12 |
| 4,565,333 | 1/1986 | Meneian | 242/54 R |

FOREIGN PATENT DOCUMENTS 2188593 1/1974 France .
2463994 9/1984 France .
2057707 4/1981 United Kingdom .

OTHER PUBLICATIONS

"Treating Device in Rotary Section for Cable and the Like", vol. 8 146 (M-307) (1583) Jul. 7, 1984.

Primary Examiner—John M. Jillions
Attorney, Agent, or Firm—Pollock, Vande Sande & Priddy

[57] ABSTRACT

A paying out/winding in device eliminates torsion in a line in a rotary connection betweeen a fixed member and a mobile member to which respective ends of the line are fixed. This device comprises a fixed spool carrying a relatively small number of turns and fastened to the fixed member. A mobile spool near and coaxial with the fixed spool carries a relatively small number of turns and is fastened to the mobile member. An arm rotatable about the axis of the fixed and mobile spools carries a satellite pulley at its free end. It is rotatable about an axis inclined at a relatively small angle to the axis of the fixed and mobile pulleys. When rotating more slowly than the mobile spool, it transfers line from the mobile spool to the fixed spool or vice-versa. The arm is rotated by a system which comprises at least one sliding coupling having a primary member, a secondary member fastened to the arm and a first freewheel mechanism coupling the primary member to the mobile spool. A second freewheel mechanism couples the secondary member to the fixed spool.

9 Claims, 2 Drawing Sheets

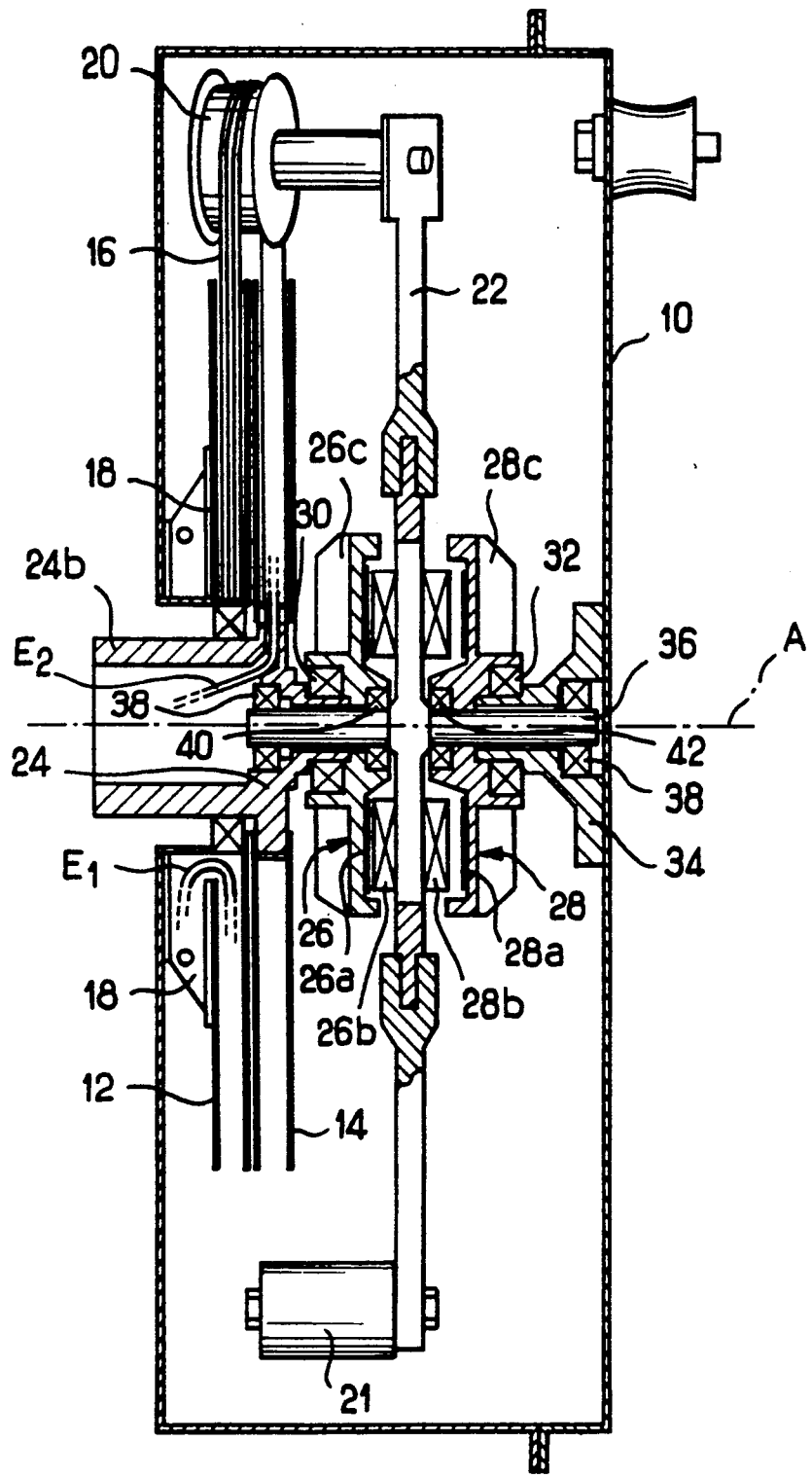
FIG_1

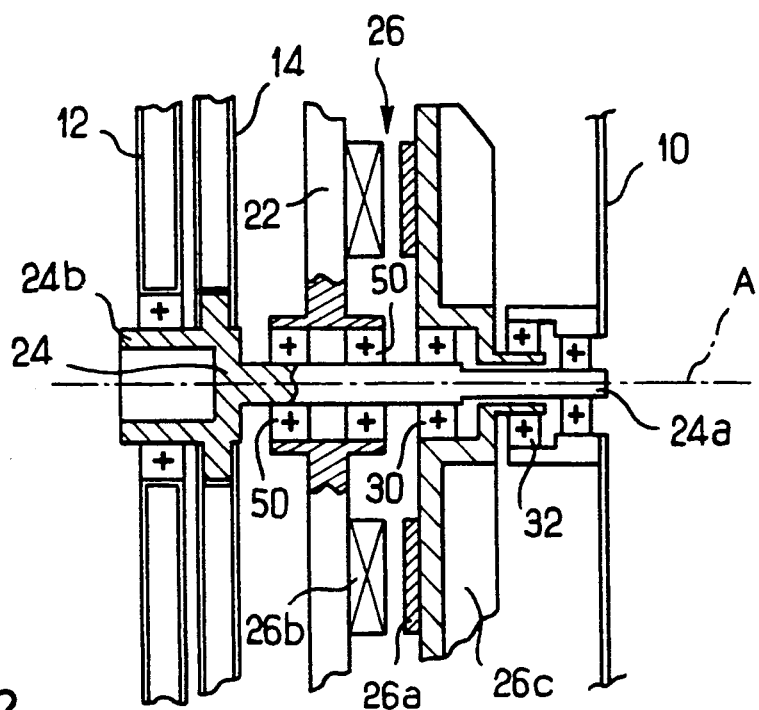
FIG_2
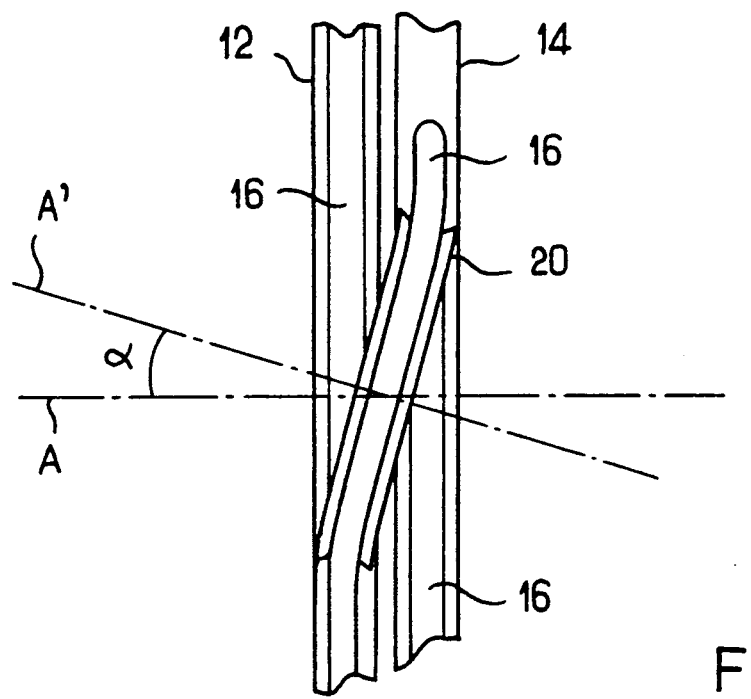
FIG_3

PAYING OUT/WINDING IN DEVICE FOR ELIMINATING TORSION IN A LINE IN A ROTARY CONNECTION

BACKGROUND OF THE INVENTION

1. Field of the invention

The present invention concerns a paying out/winding in device for eliminating torsion in a line in a rotary connection between a fixed member and a mobile member to which respective ends of the connection are fixed. Descriotion of the prior art There is already known in the prior art, in particular from FR-A-2 188 593, a paying out/winding in device comprising coaxial fixed and mobile spools designed to be respectively fastened to the fixed member and the mobile member of the rotary an arm adapted to rotate about the common axis of said fixed and mobile spools and carrying at its free end a satellite pulley which, when rotating more slowly than the mobile spool, transfers the line from the mobile spool, to the fixed spool or vice-versa, and drive means for rotating the arm comprising at least one sliding coupling having a primary member coupled to the mobile spool by a first freewheel mechanism and to the fixed spool by a second freewheel mechanism, and whose secondary member is fastened to the arm.

A serious disadvantage of this known device is that the axis of the satellite pulley is perpendicular to the axis of the spools. As a result, if it is used with flat optical fiber or other type cables, for example, substantial torsion is applied to the cable, especially between the spools and the satellite pulley, because of the marked change of direction of said cable.

Also, in this known device the sliding couplings are friction clutches. This type of clutch is disadvantageous in that it is not able to transmit to the arm a constant driving or braking torque. In particular, jerks occur on starting and stopping because of the changeover from static mode to dynamic mode friction or vice-versa and these are extremely hazardous in the case of cables such as optical fiber cables.

SUMMARY OF THE INVENTION

The present invention is intended to alleviate these disadvantages of the prior art and to propose a paying out/winding in device in which the transfer between the fixed spool and the mobile spool, and vice-versa, can be effected in an extremely regular way with a uniform tension in the line and minimal torsion of the line.

In more precise terms, an object of the invention is to propose a device for use with all kinds of lines and in particular optical fiber or like ribbon cables without significantly stressing them.

The invention consists in a paying out/winding in device for eliminating torsion in a line in a rotary connection between a fixed member and a mobile member to which respective ends of said line are fixed, the device comprising a narrow fixed spool fastened to the fixed member, a narrow mobile spool arranged near and coaxial with the fixed spool and fastened to the mobile member, an arm rotatable about the axis of the fixed and mobile spools, a satellite pulley at a free end of the arm rotatable about an axis inclined at a relatively small angle to the axis of the fixed and mobile pulleys and adapted, when rotating more slowly than the mobile spool, to transfer the line from the mobile spool to the fixed spool or vice-versa, and drive means for rotating the arm comprising at least one sliding coupling having a primary member, a secondary member fastened to the arm, a first one-way clutch coupling the primary member to the mobile spool and a second one-way clutch coupling the secondary member to the fixed spool. In the above definition and the following description, a "narrow" spool means that the number of side-by-side turns is substantially smaller than the number of turns one above the other. For instance, the internal width of the spool may be equal to or slightly greater than the width of the line.

BRIEF DESCRIPTION OF THE DRAWINGS

Other features, objects and advantages of the invention will emerge from the following detailed description of preferred embodiments of the invention given by way of example with reference to the appended drawings in which.

FIG. 1 is an elevation view in partial cross-section of a first embodiment of a device in accordance with the invention.

FIG. 2 is a partial elevation view in partial cross-section of a second embodiment of a device in accordance with the invention.

FIG. 3 is partial plan view of the device shown in FIG. 1.

DETAILED DESCRIPTION OF THE INVENTION

Parts in different figures that are identical or similar are designated by the same reference numbers.

The device shown in FIG. 1 is designed to be incorporated into a rotary connection between a mobile member and a fixed member (not shown) to which the respective ends of a line 16 are fixed in order to eliminate torsion in said line when the members turn relative to each other. It comprises, in a frame 10 fastened to the fixed member of the connection, two spools 12 and 14 between which the line 16, such as a cable, hose or the like, is transferred when there is relative rotation between the two spools. The spool 12 is fixed, for example mounted rigidly on the frame by means of attachment members 18, whereas the spool 14 is mobile in rotation, being fastened to the mobile member of the rotary connection, as will be explained later, this mobile member being driven by its own drive means. This may be, for example, a main spool onto which the line is wound or from which it is paid out.

In the known manner, it is this transfer movement which makes possible relative rotation of the two ends E1 and E2 of the line, respectively fastened to the fixed spool and the mobile spool, without generating any torsion in the line, by virtue of the reversal of the direction of winding the line from one spool to the other.

Also in a conventional way, this transfer is performed by means of a direction-changing or satellite idler pulley 20 mounted at the free end of an arm 22. The arm 22 can turn about the common axis A of the spools.

In a device of this kind, assuming that no slack appears in the line and that the two spools 12 and 14 are geometrically identical, the rotation speed Vb of the arm 22 is related to the rotation speed Vm of the mobile spool 14 by the following equation:

$$Vb = (Rm/Rf + Rm) \cdot Vm \quad (1)$$

in which Rm is the instantaneous winding radius of the line on the mobile spool 14 and Rf is the instantaneous winding radius of the line on the fixed spool 12.

Rm and Rf vary as the line is wound in and paid out. It is necessary to establish a relationship that changes with time between the rotation speed of the mobile spool and the rotation speed of the arm.

The relationship between the torque Cb applied to the arm 22 to perform the aforementioned transfer and the tension T in the line is expressed as follows:

$$Cb = T \cdot (Rf + \sqrt{Re^2 + Ri^2 - Rf^2}) \qquad (2)$$

in which Ri is the minimum winding radius of the spools 12 and 14 (with the spools empty) and Re is the maximum winding radius of the spools 12 and 14 (with the spools full).

To make the tension T in the line as constant as possible, it is necessary firstly to ensure that the drive torque Cb applied to the arm is as constant as possible.

There will now be described the means used in accordance with the invention to meet the above conditions and therefore to transfer the line under optimum conditions.

The arm 22 carrying the satellite pulley 20 is mounted to rotate freely on a drive shaft 24 and is coupled to this shaft and to the fixed frame 10 by two magnetic couplings 26, 28 and two one-way clutches 30 and 32 (shown only schematically), as will be described in more detail hereinbelow. The magnetic couplings have the property of transmitting between the primary (inductor or field) member and the secondary (induced or armature) member a torque which is essentially constant, independent of any slip that may occur between them.

With the aim of minimizing the stresses in the line 16, especially if the latter is a flat optical fiber cable, the two spools 12 and 14 are placed immediately adjacent each other and the axis A, of the satellite pulley 20 is inclined at a relatively small angle to the axis A, as can be seen particularly clearly in FIG. 3. As a natural consequence of this, the satellite carrier arm 22 is L-shaped to locate the pulley 20 in alignment with the boundary between the two spools passing through the exterior thereof.

The end 24b of the drive shaft 24 is designed to be fastened to the mobile member of the rotary connection, for example a main spool that is driven by a drive motor (these members are not shown in the drawings). The mobile spool 14 is fastened to the shaft 24.

The first one-way clutch 30 provides a positive drive link between the shaft 24 and a primary member 26a of the first magnetic coupling 26 in the direction of paying out the line 16 from the mobile spool 14. The second one-way clutch 32 is adapted to immobilize the primary member 28a of the second magnetic coupling 28 by being operative between said primary member and a member 34 which is fixed rigidly to the frame 10 of the winder device, in the direction of winding the line 16 onto the mobile spool 14. The respective secondary members 26b, 28b of the two couplings 26, 28 are both fixed rigidly to the arm 22.

This embodiment of the device has special features, as follows. The arm 22 is substantially symmetrical relative to the axis A and carries a counterweight 21 at the end opposite the pulley 20.

Also, the arm 22 is mounted rigidly on an auxiliary shaft 36 which is mounted to rotate freely in bearings 38 within the facing ends of the drive shaft 24 and the fixed part 34. The primary members 26a, 28a are carried by respective flanges 26c, 28c which are mounted to rotate freely on the shaft 36 by means of bearings 40, 42.

Finally, the fixed end El of the line is fed out into the frame 10 through the back of the fixed spool 12 and can be further routed as necessary to any device fastened to the frame. The rotating end E2 of the line is led into the interior of the shaft 24 and can be further routed to any rotary device fastened to said shaft.

The device in accordance with the invention operates in the following manner. In the direction of paying out the line 16 from the mobile spool, the shaft 24 drives the primary member 26a of the coupling 26 through the first one-way clutch 30. The electromagnetic coupling between the secondary member 26b and the primary member 26a then transmits to the arm 22 a torque equal to the nominal torque of the coupling and tending to turn said arm in the same direction as the shaft 24 and the mobile spool 14 at a speed that can vary by virtue of slip occurring in the coupling.

The effect of this constant torque is to maintain an essentially constant tension in the part of the line between the two spools 12 and 14, the value of this tension varying only slightly due to variations in time of the parameters Rf and Rm as explained above. The arm 22 and the pulley 20 are therefore rotated to wind the line 16 onto the fixed spool 12 and to pay it out from the mobile spool 14.

It is to be noted that during this movement the secondary member 28b of the coupling 28 and the associated primary member 28a can freely accompany the arm 22 as it rotates, without imparting any torque to it, as the primary member 28a is free to turn relative to the part 34 because of the second one-way clutch 32, which can only provide a positive drive coupling in the opposite direction.

In the direction of winding the line 16 onto the mobile spool 14, said line entrains the arm 22 through operating on the direction-changing pulley 20, and at the same time the arm 22 is subjected to a constant braking torque. In more precise terms, the freewheel 32 is operated in its positive drive direction and prevents the flange 28c from turning relative to the fixed part 34 and the frame. As the primary member 28a is stationary it exerts a constant torque braking action on the arm 22 through magnetic interaction with the secondary member 28b, independently of the speed of the arm.

In this case the primary member 26a and the secondary member 26b of the first coupling 26 are free to rotate in the same direction as the arm 22 and without the latter applying any unwanted torque, given that the one-way clutch 30 is then caused to operate in the direction opposite to its positive driving direction.

The advantages of the device in accordance with the invention are summarized below.

First of all, by virtue of the specific arrangement of the spools and the satellite pulley, it is evident that only minimum torsion is generated in the line 16. In this regard, the angle α between the axis A' of the satellite and the axis A of the spools is chosen for each individual application according to the geometry of the various parts. Depending on individual circumstances, it might vary in practice between 0° and 45° (it is approximately 15° in FIG. 3). For certain types of cable, it may be desired to keep the angle α as small as possible. In this case, if it is necessary to use wider spools or a greater axial spacing between the spools, then the angle α may be kept low by using a satellite pulley of larger diameter.

Because magnetic couplings are used, the arm drive torque is constant and can be determined precisely by adjusting the couplings 26 and 28. What is more, different torques can be used in the opposite directions, if required. The tension in the line 16 is therefore fully controlled at all times in accordance with the equation (2) given above, with only very slight variations due to the variations in Rf and Rm.

In this regard, it can be shown that if the ratio between Re and Ri is equal to three to one, for example, the tension applied to the line does not vary by more than 12%. This variation is reduced to 5% if the aforementioned ratio is two to one.

Also, whatever the values of the instantaneous winding radii Rf and Rm, the arm 22 and the pulley 20 are always driven at the appropriate speed. The sliding couplings 26 and 28 enable the arm 22 to adopt any angular speed between zero speed and the angular speed Vm of the mobile spool 14.

FIG. 2 is a partial view in elevation of a second embodiment of the invention.

In this embodiment, the drive shaft 24 is extended (towards the right in the figure) by a part 24a which is substituted for the auxiliary shaft 36. It supports the arm 22 which rotates on it through bearings 50. This embodiment comprises only a single coupling 26 the primary member 26b of which is fixed to the arm 22 and the secondary member 26a of which is attached to a flange 26c. The flange 26c is mounted on the extension 24a of the drive shaft by means of a first one-wheel clutch 30 and on the fixed part 34 by means of a second one-way clutch 32. These two clutches are mounted in the same orientation as in FIG. 1. The spools 12 and 14 and the satellite idler pulley 20 are arranged in the same way as in the first embodiment.

This embodiment of the device operates in an entirely similar way to the FIG. 1 device except that the single coupling 26 fulfils the same role as the two couplings 26, 28 in FIG. 1.

Although the present invention has been described with reference to a main spool for winding on and paying out the line, it may equally well be used for a rotary connection on a finite number of turns, for example between the fixed support structure and the rotating cabin structure of a crane. More generally, it may be used in any application in which two members can rotate relative to each other and must be connected by a line such as a cable, hose or the like the ends of which are respectively fixed to these members, without using slip rings and without inducing any torsion in the line. In the aforementioned case of a crane, the frame 10 of the winder device may be fixed to the fixed support structure of the crane while its rotating cab structure is fixed to the coupling part 24b of the drive shaft 24.

Also, although the invention has been described in relation to single-turn spools, it is to be understood that it applies to spools carrying multiple turns. In this case, in the case of lines to which the lowest possible torque must be imparted in transferring them from one spool to the other (as in the case of flat fiber optic cables, for example), the number of turns will be reduced as much as possible. The angle $a$ mentioned above will additionally be adjusted to suit the width of the spools.

Those skilled in the art will know how to implement the inventive concept as explained hereinabove to produce a device comprising multiple pairs of spools, each pair being associated with its own satellite pulley.

Finally, the terms "fixed" and "mobile" as used throughout this description are to be understood as being relative terms. For example, the drive shaft 24 may be fixed and the frame 10 driven in rotation and fastened to the mobile member of the rotary connection. It is equally feasible for both members of the rotary connection to rotate at different speeds.

I claim:

1. Paying out/winding in device for eliminating torsion in a line in a rotary connection between a fixed member and a mobile member to which respective ends of said line are fixed, the device comprising a narrow fixed spool fastened to the fixed member, a narrow mobile spool located adjacent to and coaxial with the fixed spool and fastened to the mobile member, an arm rotatable about the axis of the fixed and mobile spools, a satellite pulley at a free end of the arm rotatable about an axis inclined at a relatively small angle to the axis fo the fixed and mobile pulleys, and said satellite pulley, when rotating more slowly than the mobile spool, transferring the line from the mobile spool to the fixed spool or vice-versa, and drive means for rotating the arm comprising at least one sliding coupling having a primary member, a secondary member fastened to the arm, a first one-way clutch coupling the primary member to the mobile spool and a second one-way clutch coupling the secondary member to the fixed spool.

2. Device according to claim 1, wherein said at least one sliding coupling is a magnetic coupling.

3. Device accoridng to claim 1, comprising two sliding couplings each having its primary member coupled to a respective one-way clutch and its secondary member fastened to said arm.

4. Device according to claim 3, wherein said drive means further comprises a drive shaft fastened to said mobile spool and one end of which is coupled to said mobile member of the rotary connection, its opposite end being coupled to said first one-way clutch.

5. Device according to claim 4, wherein said second one-way clutch is coupled to said fixed spool by a fixed member aligned with said drive shaft and fixed to a frame of the device to which said fixed spool is also fixed.

6. Device according to claim 5, wherein said arm is fastened to an auxiliary shaft mounted to rotate on mutually facing ends of said drive shaft and said fixed part.

7. Device according to claim 6, wherein said primary members of said two sliding couplings are fixed to two flanges rotatably mounted on said auxiliary shaft.

8. Device according to claim 1, comprising a single sliding coupling said secondary member of which is attached to a flange coupled to said two one-way clutches and mounted to rotate on a drive shaft fastened to said mobile spool and coupled to said mobile member of said rotary connection, and wherein said arm is also mounted to rotate on said drive shaft.

9. Device according to claim 1, wherein said arm is generally L-shaped with one part extending outwardly of said spools and substantially perpendicularly to their axis, its other part being substantially parallel to said axis and carrying said satellite pulley at its free end.

* * * * *